Nov. 10, 1931.  A. SUNDH  1,830,919
SELF HOLDING DEVICE FOR NUTS
Filed July 13, 1928
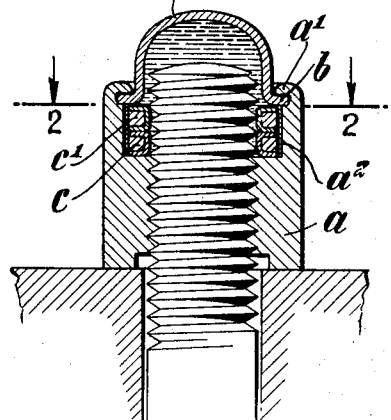
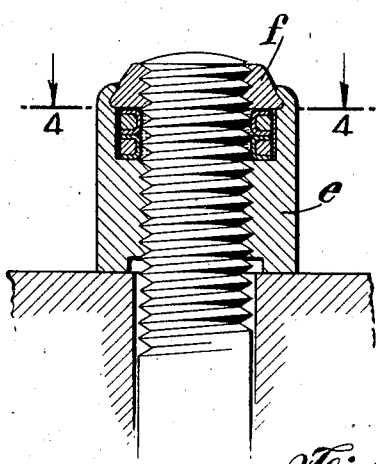
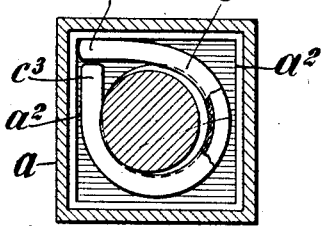
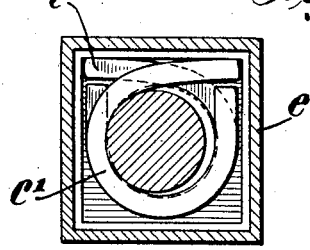
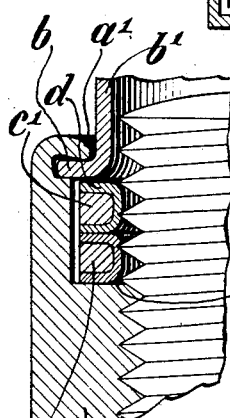
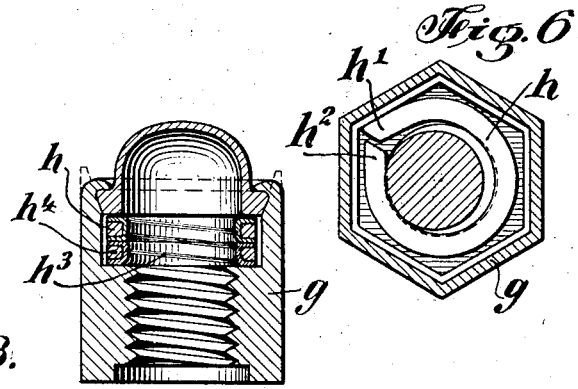
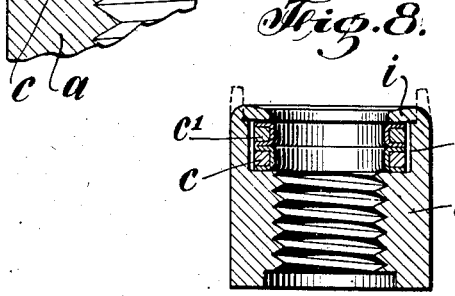
INVENTOR.
August Sundh,
BY his
Redding, Greeley, O'Shea & Campbell
ATTORNEYS.

Patented Nov. 10, 1931

1,830,919

UNITED STATES PATENT OFFICE

AUGUST SUNDH, OF HASTINGS UPON HUDSON, NEW YORK

SELF-HOLDING DEVICE FOR NUTS

Application filed July 13, 1928. Serial No. 292,440.

In a co-pending application filed by the present applicant on March 17, 1928, Serial No. 262,381 there is disclosed and claimed self-holding devices for nuts operating on a principle distinguished from so-called lock nuts as heretofore proposed. The present invention relates to self-holding devices for lock nuts which operate on the same principle but which embody features that may have particular value under some conditions of use. The principal object of the invention is to provide in such a nut self-holding devices which may be incorporated therein with the greatest facility, minimum expense and greatest certainty of invariable operation. More particularly, the improved construction is one in which the holding springs are formed as individual single coils inexpensive to manufacture and adapted for assembly in any desired number for each size and form of nut. Further, such springs may be assembled so that their holding action may be compounded or mutually opposed thereby satisfying different requirements of use as to the extent of the holding force with relation to the direction of rotation of the nut. Still another important characteristic of the improved construction is that each spring is of such dimension and form as to insure positive actuation thereof by the nut to set up the desired predetermined maximum holding force and, contrariwise, prevent positively increase of such holding force after such predetermined maximum has been reached.

A further object of the invention is to provide for the retention of a lubricant within the water-tight enclosure for the holding devices whereby certain physical and mechanical advantages in the operation of the construction are obtained. One of these advantages is referable to another important characteristic of the improved holding devices namely, the control of the relative hardness of the spring and the bolt threads so that the material of the spring receives an impression from the bolt threads although it is not actually cut thereby. Where such an impression is permitted it has been found that the presence of a lubricant actually affords protection to the metal while increasing the holding effect of the springs on the threads.

These and other objects of the invention will be pointed out in connection with the detailed description of the several embodiments illustrated in the accompanying drawings wherein:

Figure 1 is a view in section showing the application of the improved device to a bolt and in which the enclosure therefor also encases the end of the bolt.

Figure 2 is a sectional view of the construction shown in Figure 1 and taken on the plane indicated by the line 2—2 of Figure 1 and looking in the direction of the arrows.

Figure 3 is a fragmentary detailed view on somewhat a larger scale showing the relationship of the threads to the holding springs when the parts shown in Figure 1 are engaged.

Figure 4 is a sectional view of a modified form in which the enclosure for the lubricant is threaded through to permit the passage of the bolt.

Figure 5 is a sectional view of the parts shown in Figure 4 taken on the plane indicated by the line 4—4 of Figure 4 and looking in the direction of the arrows and showing two springs laid in opposite directions.

Figure 6 is a sectional view showing the adaptation of a similar holding device to a hexagonal nut.

Figure 7 is a sectional view of a somewhat modified construction showing the impression left in the metal of the springs by the bolt threads.

Figure 8 is a sectional view of still another modification before the application of the spring to a bolt.

In the forms shown in Figures 1–3 the nut $a$ is shown of rectangular form and may be substantially of any usual type but provided with a peripheral flange $a'$ adapted to be clinched onto the peripheral flange $b$ of a cap $b'$ to form a water-tight enclosure at one end of the nut. Within the nut is a rectangular cavity $a^2$ to receive the holding springs illustrated at $c$, $c'$. These or other suitable forms of holding springs are received within the cavity $a^2$ and may be so designed with reference to the specification thereof as to be held against longitudinal movement therein by the cap $b'$ as appears clearly in Figures 1 and 3. Further, such springs are free to expand radially within the cavity $a^2$ when the bolt is threaded in such expansion, setting up meanwhile a contractive force by which the nut is held against accidental displacement on the bolt in accordance with the principle set forth in said co-pending application Serial No. 262,381.

In accordance with the present invention it is proposed to provide holding springs $c$, $c'$, each consisting of a single turn one end designated in Figure 2 as $c^2$ extending tangentially for engagement by the nut when the latter is rotated and the other free end designated as $c^3$ in Figure 2 extending tangentially but terminating with its butt ends spaced from the side of the other free end $c^2$, the last named free end $c^3$ normally being spaced also from the adjacent wall of the cavity $a^2$ within the nut. Springs of this type are inexpensive to manufacture and a plurality of such springs may be caused to exert an aggregative contractive force greater than can be exerted by an equal number of turns in a single coiled spring. Further, such single turns are convenient to handle and assemble initially. For a nut of given size and form they are freely interchangeable and any desired number may be brought together in a cavity of sufficient depth to receive them.

In accordance with the present invention it is proposed to make the inner surface of each such springs $c$, $c'$, of a metal that is softer than the threads of the bolt so that an impression may be made in such metal by the threads of the bolt as indicated, for instance, in Figures 3 and 7. To this end, the springs are shown as provided with a surface lining $d$. The degree of softness is such that while the threads will make an impression they will not cut or actually bruise the metal. This relationship has been found to be of special benefit where, for instance, a brass bolt or a soft iron bolt is used. The contractive force of the spring is impressed on the threads with the greatest degree of friction as is desirable. Damage to the threads of the bolt is guarded against. Where, as in Figure 1, a lubricant is contained within the enclosure $b'$ and this lubricant lies within the space between the threads of the bolt and the springs $c$, $c'$, added protection against cutting or injury is afforded by the lubricant. This lubricant, however, of course, serves the important physical purpose of protecting all of the parts against the entry of injurious moisture and resulting rust.

Turning now to Figure 2 the mechanical aspect of the holding will be described. When the nut is threaded onto the bolt free entry is assured by the inclined entering surface indicated at $c^4$ in Fig. 3 on the entering edge of the spring $c$. Since all of the single springs are identical and may be used in any position each side of each spring is provided with such an inclined surface. Further, since the springs are not of the same pitch as the pitch of the threads nor of a size to permit them to enter the spaces between the threads, it will be evident that progressive movement of the bolt merely results after initial entry in the forming of impressions on the inner surfaces of the springs without interfering with such progression. Since each spring is normally of less than the overall diameter of the bolt the bolt will expand each spring successively as it moves therethrough. Each spring is held in fixed relation to the nut by engagement of the free end $c^2$ with the walls of the cavity $a^2$. After the nut is on the bolt, as indicated in Figure 1, accidental displacement of the nut is prevented by the holding force applied to the bolt through the contractive springs $c$, $c'$. If the nut tends to turn on the bolt the holding force is momentarily increased since as shown in Figure 2 the nut will bear on the free end $c^2$ of each spring and tend to wrap that spring further around the bolt thereby creating a sort of clutch action which for the moment clearly increases the holding force, at least up to a predetermined degree. When it is desired to remove the nut from the bolt it will be turned with the free end of the spring $c^2$ against the maximum holding force until the side of the ends $c^2$ actually engage the butt of the other free ends $c^3$ whereupon continued movement of the nut will be impressed upon the ends $c^3$ so as to prevent increase of the holding force and positively cause movement of each spring around the threads of the bolt and facilitate removal of the nut.

In the forms shown in Figures 4 and 5 the nut $e$ is shown as having secured in its end a closure $f$ which is threaded, however, to permit the bolt to extend therethrough as is desirable in some instances. Nevertheless, when the parts are assembled as shown in Figure 4 the engagement of the bolt with the closure $f$ taken with the relationship between the periphery of the closure $f$ and the nut will insure a water-tight closure for the holding springs. A lubricant may be retained within the cavity for the springs and held therein by the closure $f$. As illustrated in Figure 5 the springs $c$, $c'$, are shown as assembled with their free ends extending in opposite directions, the result being that one of the springs offers effective resistance to turning of the nut in one direction and the other spring offers effective resistance to turning of the nut in the opposite direction. Contrariwise, the increase of holding effect of one spring or the other is positively prevented as described in connection with the embodiment of Figure 2 wherein the action of the springs is supplementary.

In Figure 6 there is illustrated a hexagonal nut $g$. The holding spring $h$ illustrated therein has a single turn. One free end $h'$ extends tangentially and bears against one of the walls of the hexagonal cavity in the nut so that rotation of the nut in a counterclockwise direction will serve to press this free end $h'$ towards the bolt and increase the holding action of the spring. The other free end $h^2$ of the spring terminates in proximity to the other end $h'$ but is spaced therefrom such a distance that the free end $h'$ must be moved a predetermined extent before contact is brought about. When the two ends thus contact continued movement of the nut will be impressed on the free end $h^2$.

Figure 7 shows the impression $h^3$ made on the inner surfaces of the soft lining of the springs $h$, $h^4$, after they have been threaded onto a bolt and the bolt subsequently removed.

Figure 8 shows a construction in which an end flange $i$ on the end of a nut $i'$ is turned over to hold the springs $c$, $c'$, within the cavity $i^2$ and against longitudinal movement as was described with reference to Figures 1 and 3.

Changes in form and dimension of the parts described may be made without departing from the principle of the invention so long as the results desired are obtained by means which function substantially in accordance therewith.

What I claim is:

1. In combination with a nut, a holding device therefor comprising a coiled spring having one end engageable by the nut to cause rotation of the spring with the nut in one direction along a bolt, the other end of the spring being engageable by the first named end when the nut is rotated a predetermined distance in the opposite direction.

2. In combination with a nut, a holding device therefor comprising a metallic spring element having one end engageable by the nut to increase the holding force of the spring on the threads of a bolt when the nut rotates in one direction, the other end of the spring being normally spaced a predetermined distance from the first named end but engageable thereby whereby increase of the holding force of the first named end is prevented when the nut is turned further in the same direction a sufficient distance to cause engagement of the two ends.

3. In combination with a nut, a holding device therefor comprising a plurality of coiled springs each having a single turn, one end of each of said springs being engageable by the nut upon rotation in one direction to increase the holding force on the threads of a bolt and the other end of each of said springs being engageable with the first named ends, respectively, when the nut is turned further in the same direction.

4. A nut formed with a cavity at one end, holding devices for the nut disposed in said cavity and comprising a plurality of single turned spring coils adapted to be expanded when threaded onto a bolt and each having an end respectively engageable by a wall of the cavity to cause simultaneous rotation of said springs when the nut is turned.

5. In combination with a nut, a holding device therefor comprising a plurality of open-ended single turned springs carried in parallelism on the nut and maintained in juxtaposition when threaded onto a bolt to exert uniformly a contractive holding force thereon, each of the springs having an end engageable by the nut to increase such contractive holding force when a predetermined force is applied to the nut tending to turn it in one direction.

6. In combination with a nut a holding device therefor comprising a plurality of coiled springs each having a single turn, one end of certain of said springs being engageable by the nut upon rotation in one direction and one end of the remaining springs being engageable by the nut upon rotation in the opposite direction, to increase the holding force on the threads of a bolt, the other end of each of said springs being engageable with the first named ends, respectively, when the nut is turned further in the said directions.

This specification signed this 12th day of July, A. D. 1928.

AUGUST SUNDH.